United States Patent
Yamamoto et al.

(10) Patent No.: US 7,350,937 B2
(45) Date of Patent: Apr. 1, 2008

(54) LIGHTING UNIT, LIGHTING MODULE, AND LIQUID CRYSTAL DISPLAY

(75) Inventors: Tsunenori Yamamoto, Hitachi (JP); Ikuo Hiyama, Hitachinaka (JP); Akitoyo Konno, Hitachi (JP); Daisuke Kajita, Hitachi (JP)

(73) Assignee: Hitachi Displays, Ltd., Mobara-Shi (JP)

( * ) Notice: Subject to any disclaimer, the term of this patent is extended or adjusted under 35 U.S.C. 154(b) by 181 days.

(21) Appl. No.: 11/136,509

(22) Filed: May 25, 2005

(65) Prior Publication Data
US 2005/0265051 A1 Dec. 1, 2005

(30) Foreign Application Priority Data
May 25, 2004 (JP) .............................. 2004-154725

(51) Int. Cl.
*F21V 21/00* (2006.01)
(52) U.S. Cl. .................. 362/249; 362/251; 362/659
(58) Field of Classification Search ............... 362/219, 362/240, 249, 250, 251, 252, 294, 367, 373, 362/394, 612, 630, 652, 657, 658, 659
See application file for complete search history.

(56) References Cited

U.S. PATENT DOCUMENTS

| | | | | |
|---|---|---|---|---|
| 5,161,882 A | * | 11/1992 | Garrett | ..................... 362/249 |
| 5,337,225 A | * | 8/1994 | Brookman | ................... 362/652 |
| 5,559,681 A | * | 9/1996 | Duarte | ........................ 362/252 |
| 6,042,243 A | * | 3/2000 | Grill et al. | ................... 362/219 |
| 6,561,663 B2 | | 5/2003 | Adachi et al. | |
| 6,634,772 B2 | * | 10/2003 | Yaphe et al. | ................. 362/260 |
| 6,874,910 B2 | * | 4/2005 | Sugimoto et al. | ........... 362/294 |

FOREIGN PATENT DOCUMENTS

| | | |
|---|---|---|
| JP | 2002-351342 | 12/2002 |
| JP | 2003-156728 | 5/2003 |

OTHER PUBLICATIONS

"18.1-inch XGA TFT-LCD with Wide Color Reproduction using High Power LED Backlighting", Hideyo Ohtsuki, et al. SID' 02 Digest pp. 1154-1157, no date.
"LED backlight for large area LCD TV's" Robert Scott West, et al. IDW' 03, pp. 657-659, no date.

* cited by examiner

*Primary Examiner*—Y. My Quach-Lee
(74) *Attorney, Agent, or Firm*—Antonelli, Terry, Stout & Kraus, LLP.

(57) ABSTRACT

There is provided a lighting unit whose area is implemented into a large area by assembling a plurality of lighting modules in a flat-surface-like manner. Moreover, a plurality of electrical connectors are positioned in each lighting module in such a manner that the electrical connectors face each side of each lighting module. Here, the plurality of electrical connectors are mutually connected to the plurality of lighting modules adjacent thereto.

24 Claims, 8 Drawing Sheets

LIGHTING UNIT, LIGHTING MODULE, AND LIQUID CRYSTAL DISPLAY

BACKGROUND OF THE INVENTION

The present invention relates to a lighting unit and lighting modules for implementing low-cost display whose display quality is excellent, and a liquid-crystal display using these unit and modules.

Hereinafter, the explanation will be given below concerning a conventional lighting unit and lighting modules, and a liquid-crystal display using these conventional unit and modules.

Up to the present, as displays, a CRT display has been in the mainstream thereof. In recent years, however, an active-matrix liquid-crystal display (which, hereinafter, will be referred to as "LCD") has been becoming more and more prevalent. The LCD is a display which utilizes light transmittance property of liquid crystal. Namely, the liquid crystal itself emits no light, and performs display by allowing light of a backlight to be transmitted/cutoff. Here, the backlight exists at the rear surface of the liquid crystal.

As most of backlights for this LCD, a fluorescent tube has been used. In recent years, however, there have existed the following reports: Namely, in order to enhance color reproductivity of a displayed image, a light emitting diode (hereinafter, referred to as "LED element") is used as the backlight. Examples of these reports are as follows: "18.1-inch XGA TFT-LCD with Wide Color Reproduction using High Power LED-Backlighting", Hideyo Ohtsuki, et al., SID'02 DIGEST, pp. 1154-1157.

The LED element described in this document is a one considerably close to a point light source. As a result, in order to use this LED element as the backlight for a liquid-crystal display for performing flat-surface display, it becomes necessary to assemble the LED elements in plural number and thereby to form a flat-surface light source.

Also, the LED element at present exhibits the following characteristics conspicuously: Namely, in the electric-power-to-light-emission-brightness efficiency (Referred to as light emission efficiency hereafter.), the LED element is lower than the fluorescent tube used so far. Moreover, this light-emission efficiency is lowered by temperature rise.

As a method for solving these problems, there has existed "LED backlight for large area LCD TV's", Robert Scott West, et al., IDW'03, pp. 657-659. This document indicates an embodiment where large-sized LED elements having an excellent heat-radiation characteristic are positioned in a straight-line-like manner along a few rows.

Also, as an example of the method of forming the flat-surface light source, there has existed JP-A-2002-351342. This document indicates an embodiment where the backlight of the LED elements is configured to be separated into a plurality of regions. Furthermore, there has existed JP-A-2003-156728. This document indicates an example where a diffuser is provided on this flat-surface light source thereby to reduce brightness unevenness which occurs in boundary portions of the flat-surface light source.

SUMMARY OF THE INVENTION

In the document of "LED backlight for large area LCD TV's", however, a large-sized LED-element chip which is special and is not used as a general usage is used as a large-sized package of the heat-radiation structure which is also special. This situation makes the cost exceedingly high.

Also, the unit as light sources to be positioned in the backlights is, further, a large-sized board on which the LED-element packages of the light sources are mounted in large number in a single row. Moreover, the position at which this board is positioned within the backlights differs depending on sizes of the backlights. Accordingly, the design and manufacturing also differ depending on the sizes of the backlights. This situation significantly reduces the effect of cost lowering acquired by the mass production.

Meanwhile, in the example shown in JP-A-2003-156728, the backlight of the LED elements is configured to be separated into the plurality of regions. Furthermore, the light-emission brightness uniformity between the regions is secured by the diffuser alone.

This securing of the light uniformity by the diffuser alone may be sufficient for a LCD used for a camcorder shown in this example. This securing, however, is insufficient in a LCD for large-sized liquid-crystal TVs or a monitor-purpose LCD. This situation requires implementation of further countermeasures.

It is an object of the present invention to solve the problems and issues like this. Namely, it is the object of the present invention to provide a low-cost and high-performance lighting unit and lighting modules which exhibit none of the picture-quality degradation such as the light nonuniformity, and a high picture-quality liquid-crystal display using these unit and modules.

In the present invention, in order to accomplish the above-described object, there is provided a lighting unit whose area is implemented into a large area by assembling a plurality of lighting modules in a flat-surface-like manner, wherein electrical connectors of each lighting module are positioned in such a manner that the electrical connectors face each side of each lighting module. Also, the electrical connectors are basically positioned in such a manner that the electrical connectors face portions other than places at which normal lines are pulled down onto each side of each lighting module from the most-outer circumference of each light-source component. Also, the electrical connectors face two sides opposed to each other, and are positioned at the same position in a direction perpendicular to the two sides. Also, the electrical connectors are positioned in such a manner that the electrical connectors are opposed to each other when the same lighting modules are made adjacent to each other by being made successive in a flat-surface manner.

At the upper portion of each light-source component positioned in each lighting module, a flat surface is formed which is parallel to the lighting-module flat surface. Preferably, the outside configuration of each lighting module is a rectangle. Also, the aspect ratio is equal to about 16:9 or about 4:3, and the diagonal size is equal to an integral multiple of about 1 inch (1 inch≈25.4 mm).

In the lighting unit and lighting modules according to the present invention, and the liquid-crystal display using these unit and modules, as a backlight whose area is implemented into the large area by assembling the plurality of lighting modules in the flat-surface-like manner, the outside configuration of each lighting module is made geometrically similar to the outside configuration of the LCD. Also, the size of each lighting module is made equal to an integral multiple of inch size which is often used as the diagonal size of the LCD. As a result, increasing or decreasing the number of the lighting modules to be used allows the lighting modules to be made adaptable for use as backlights for LCDs having different sizes. This allows mass production of the lighting modules as standardized products, thereby making it possible to implement the cost lowering.

Also, the electrical connectors are not positioned between each light-source component and each side of each lighting module. As a result, it becomes possible to position the light-source components with a substantially equal spacing between the respective lighting modules as well. This allows an enhancement in the light-emission uniformity.

As having been explained so far, the liquid-crystal display using the low-cost and high light-uniformity lighting unit and lighting modules allows implementation of a high picture quality with a low cost and without the picture-quality degradation.

Other objects, features and advantages of the invention will become apparent from the following description of the embodiments of the invention taken in conjunction with the accompanying drawings.

DESCRIPTION OF THE EMBODIMENTS

Hereinafter, referring to the drawings, the explanation will be given below concerning embodiments of the present invention.

Embodiment 1

Figure 1:
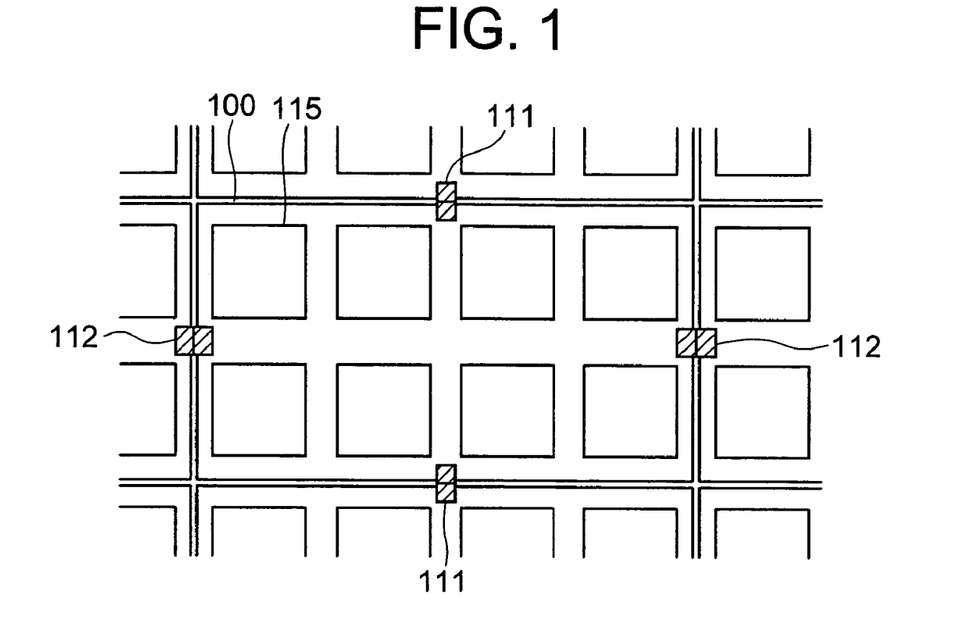
FIG. 1 is an outside configuration diagram of each lighting module used in a lighting unit in a first embodiment of the present invention.

FIG. 1 illustrates each lighting module used in a lighting unit in the present embodiment.

Concerning a lighting module 100 in the present embodiment, the outside configuration is a rectangle. Also, the aspect ratio is equal to 16:9, and the diagonal size is equal to 4 times as large as about 1 inch (1 inch~25.4 mm), i.e., 100 mm (about 4 inches). In addition to this, letting distances between mutually adjacent lighting modules in transverse and longitudinal directions be an order of 1 mm each, the lighting-module spacing in the diagonal direction becomes equal to substantially 4 inches. Namely, by setting the diagonal size of the lighting module 100 to be 100 mm, which is about 1.6 mm smaller than 4 inches, the lighting-module spacing in the diagonal direction becomes equal to substantially 4 inches.

Figure 2:
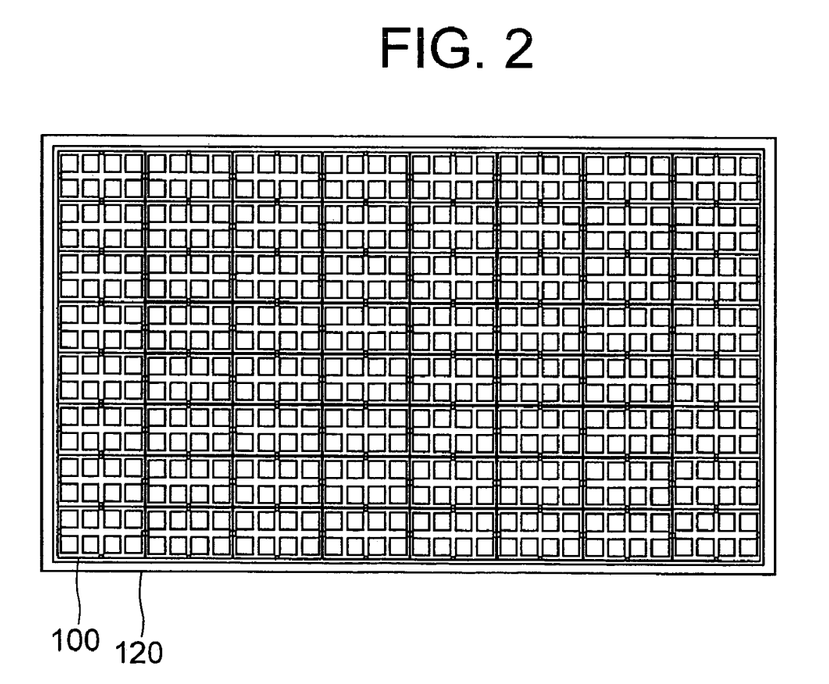
FIG. 2 is a diagram for illustrating the lighting unit where the lighting modules in the first embodiment of the present invention arranged in a flat-surface-like manner.

As illustrated in FIG. 2, these lighting modules 100 are set in such a manner that the lighting modules 100, which are 8×8 in number in the transverse and longitudinal directions, are arranged on a rear-surface board of the lighting unit. This makes it possible to configure the lighting unit 120 in 32-inch diagonal size.

The respective lighting modules 100 are connected to each other by longitudinal-direction electrical connectors 111 which face up and down sides of the respective lighting modules 100, and by transverse-direction electrical connectors 112 which face right and left sides of the respective lighting modules 100.

At present, in many of large-sized liquid-crystal TVs, aspect ratios of the screens are made equal to about 16:9. This is performed in order to implement optimization for High-Definition TV Broadcasting. Also, from the era of CRT TVs, in many cases, screen diagonal dimensions of TV sets are differentiated and classified using inch sizes.

A large number of variations exist for the screen sizes of the TV sets. Here, if backlights adaptable to LCDs of all diagonal sizes are designed and manufactured individually, the mass-production effect will be reduced. Accordingly, it is considerably unlikely that the cost will be lowered.

In the lighting unit in the present embodiment, however, the diagonal size is designable in a scaleable manner on the 4-inch-unit basis. Moreover, the lighting modules to be used are co-usable in all sizes. This allows implementation of the mass production, thereby permitting implementation of the cost lowering.

One factor which is important here is as follows: Namely, unless LED elements 115, i.e., light-source components positioned on each lighting module 100, are positioned with a substantially equal spacing within each lighting module 100 and between the respective lighting modules 100 as well, the light uniformity as the lighting unit 120 becomes worse. As a result, the picture-quality degradation occurs on a LCD which uses this lighting unit.

The above-mentioned JP-A-2003-156728 describes that the light nonuniformity between the respective lighting modules can be uniformalized by the diffuser.

In the LCD for the camera-integrated VCR, i.e., a product application of the LCD in JP-A-2003-156728, request for the light uniformalization is not so strong, and the LCD is small in size. Accordingly, the light nonuniformity may be inconspicuous. In the large-sized liquid-crystal TVs, however, request performance for the light uniformity is strong, and the LCD is large in size. Consequently, merely sandwiching the diffuser finds it impossible to amend the light nonuniformity between the respective lighting modules up to the request-performance level.

For this reason, between the respective lighting modules as well, the LED elements 115, i.e., the light-source components, need to be positioned with the spacing which is substantially equal to the one within each lighting module 100.

However, if the LED elements 115 are positioned within each lighting module 100 such that the equal spacing can be implemented between the respective lighting modules as well, a spacing between each lighting-module outer circumference and the LED elements 115 becomes extremely narrow. This situation makes it difficult to position the electrical connectors there.

Figure 3:
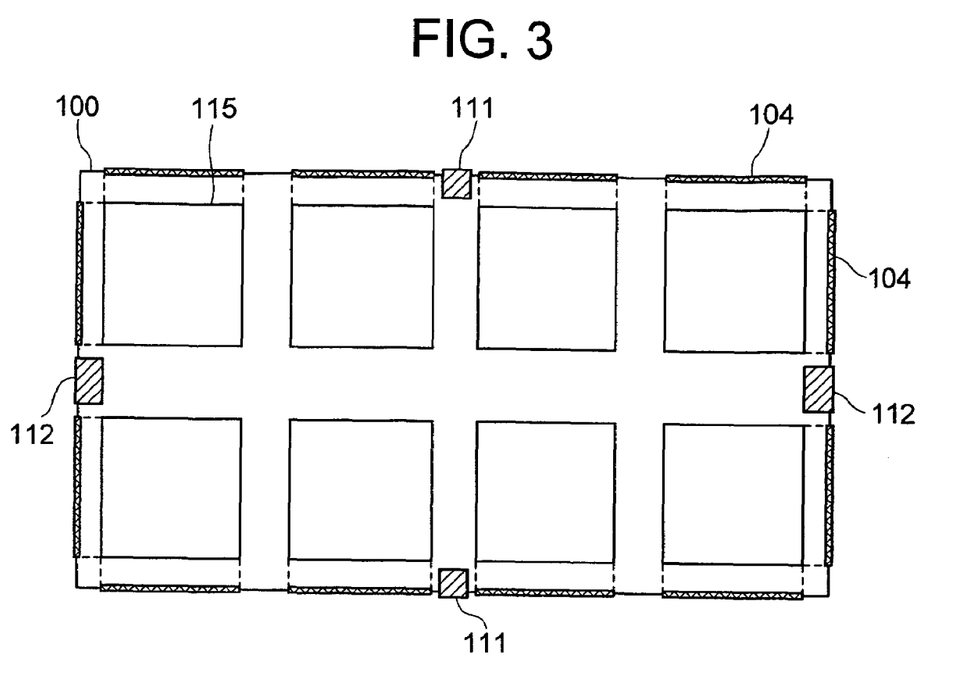
FIG. 3 is a diagram for illustrating places at which normal lines are pulled down onto each side of each lighting module from the most-outer circumference of each light-source component on each lighting module in the first embodiment of the present invention.

FIG. 3 illustrates, by edge portions 104, places at which perpendicular lines are dropped onto each side of each lighting module 100 from the sides of light-source components 115 on each lighting module 100.

In the present embodiment, the longitudinal-direction electrical connectors 111 and the transverse-direction electrical connectors 112 are positioned at places which face sides other than the edge portions 104 in FIG. 3. As a consequence, it becomes possible to position the LED elements 115 with the substantially equal spacing within each lighting module 100 and between the respective lighting modules 100 as well. This allows implementation of the lighting unit which exhibits excellent light uniformity.

Incidentally, establishing the electrical connection among the respective lighting modules 100 requires only a slight amount of time and labor. The reason for this is as follows: The longitudinal-direction electrical connectors 111 and the transverse-direction electrical connectors 112 face the two sides opposed to each other, and are positioned at the same positions in the perpendicular directions relative to each side. Moreover, when the same lighting modules are made adjacent to each other by being made successive in a matrix-like manner, the electrical connectors 111 and the electrical connectors 112 are positioned such that the electrical connectors are opposed to each other.

In this case, within each lighting module 100, the respective LED elements 115, which are positioned in, e.g., a 2-row×4-column matrix-like manner, i.e., 8 elements in total, are electrically connected to each other in succession. Then, the LED elements 115 thus connected are connected to the up and down longitudinal-direction electrical connectors 111 or the right and left transverse-direction electrical connectors 112.

Also, the 2-row×4-column matrix-like LED elements 115 are connected to the up and down longitudinal-direction electrical connectors 111 in the column unit, or are connected to the right and left transverse-direction electrical connectors 112 in the row unit. Instead of using the above-described lighting in the lighting-module-100 unit, this connection permits use of a detailed and finer lighting in response to a display signal in the row unit or column unit of the LED elements 115.

As seen from the above-described explanation, in the present embodiment, in comparison with the lighting unit of the bulk unit type as was described in the above-described "LED backlight for large area LCD TV's", the lighting unit is formed into the lighting-module assembly type. On account of this, the cost rising is exceedingly small, whereas the effect of cost lowering acquired by the mass production of the lighting modules is by far larger.

Additionally, in the present embodiment, parallel-plug-in or perpendicular-plug-in capable connectors are used as the electrical connectors. Consequently, by merely positioning the lighting modules 100 on the rear-surface board of the lighting unit 120 such that the lighting modules are made adjacent to each other in the matrix-like manner, the electrical connection is established. This makes absolutely unnecessary a time and labor which is supposed to be required for establishing the electrical connection among the respective lighting modules.

Figure 4:
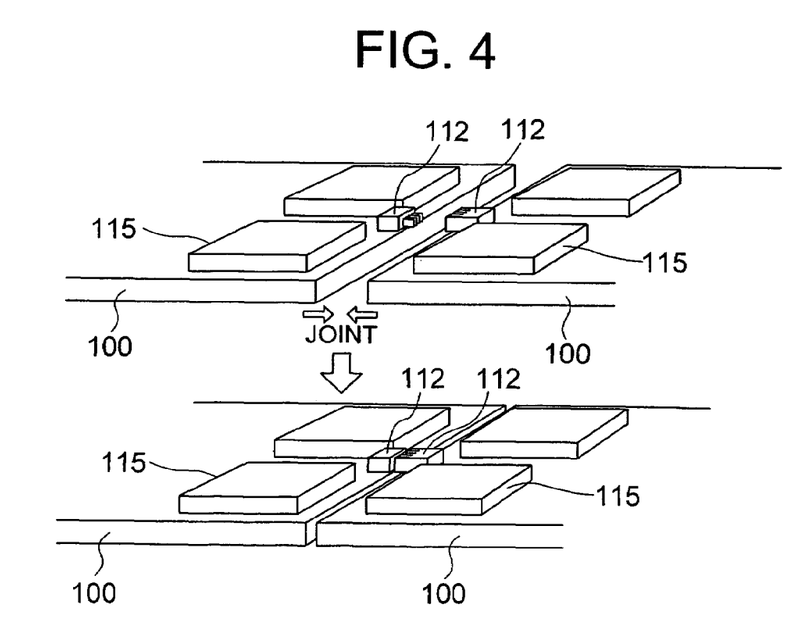
FIG. 4 is a diagram for illustrating electrical connectors of each lighting module in the first embodiment of the present invention.

FIG. 4 illustrates the parallel-plug-in or perpendicular-plug-in capable connectors as the electrical connectors 112 in the present embodiment.

LED-element chips used for the LED elements 115, i.e., the light-source components mounted on each lighting module 100 in the present embodiment, are not specially-sized products (large in size), but general products in size of the currently-used ordinary industrial level. Furthermore, the light-emission efficiency and its temperature characteristic are of the ordinary specification. Consequently, the efficiency is worse than that of a fluorescent tube, and becomes even worse by temperature rise.

On account of this, in the present embodiment, an aluminum metallic plate is used as the substrate of each lighting module 100. Moreover, an extremely-narrow wiring pattern is pasted thereon, and the LED-element chips are implemented thereon directly. This configuration makes the heat-radiation characteristic very excellent, thereby suppressing the lowering in the light-emission efficiency.

Figure 5:
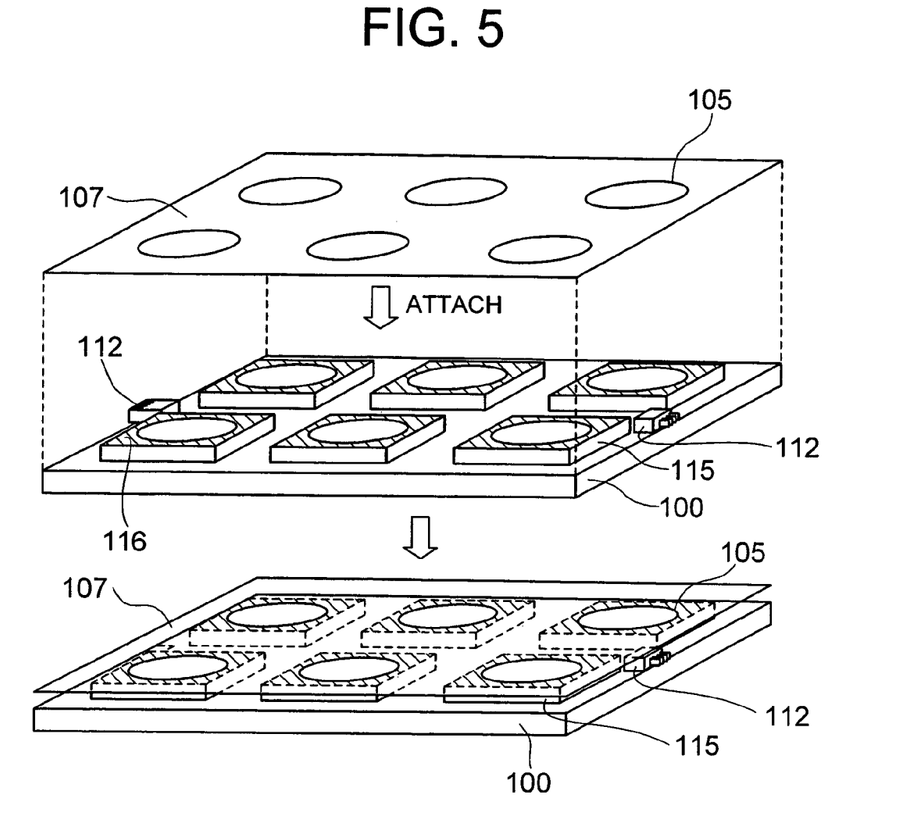
FIG. 5 is a diagram for illustrating a flat-surface portion on each light-source component parallel to each lighting module in the first embodiment of the present invention, and a diffuser pasted thereon.

Also, as illustrated in FIG. 5, in the present embodiment, flat surfaces 116 which are parallel to the board flat-surface of a lighting module 100 are provided on the upper surfaces of the LED elements 115. In addition, an exceedingly-high reflectivity diffuser 107, which has a plurality of lighting transmittance apertures 105 in correspondence with the respective LED elements 115, is pasted on these flat surfaces 116. This is performed in order to enhance the light-emission efficiency even further from the standpoint of configuration as the backlight. Incidentally, the LED elements 115 within this lighting module 100 are positioned in a 2-row×3-column matrix-like manner, i.e., 6 elements in total.

Figure 15:
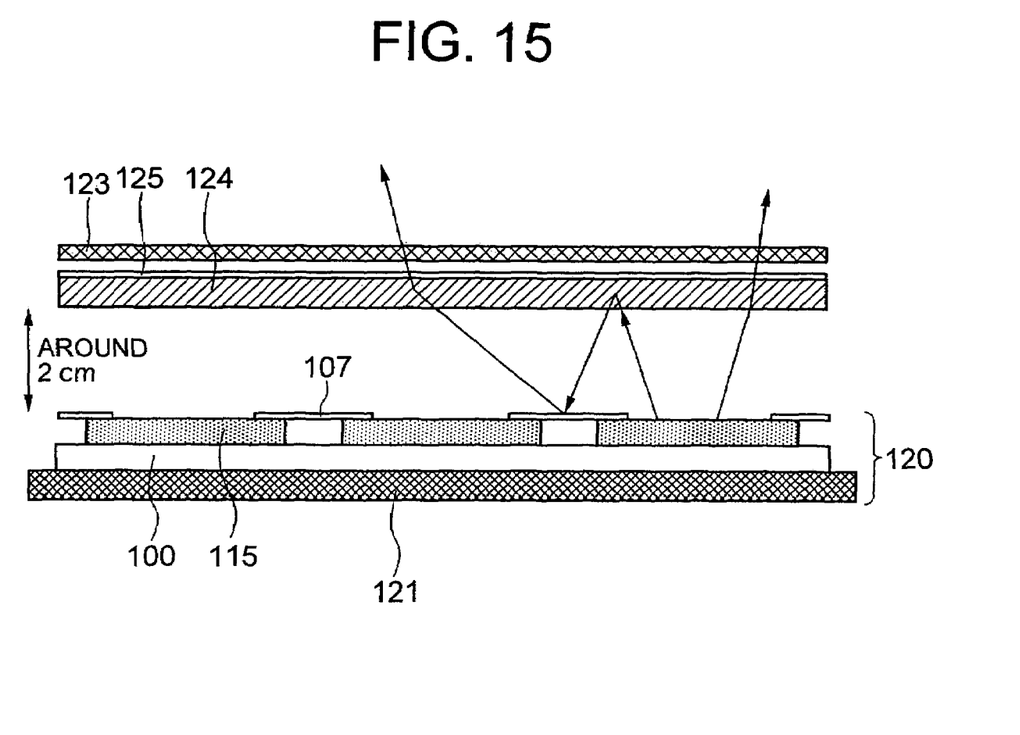
FIG. 15 is a cross-sectional view of a liquid-crystal display in an eighth embodiment of the present invention.

On account of this, as illustrated in FIG. 15 which will be explained later, the following phenomena are made possible: Namely, light which had been emitted from the lighting unit 120 but has returned by being reflected by a liquid-crystal panel, scattered light inside the lighting unit 120, or the like is launched to the liquid-crystal panel once again without being absorbed into the board of the lighting module 100, a clearance with the LED elements 115, or the like. As a consequence, it becomes possible to enhance the light-emission efficiency.

Additionally, in the present embodiment, the average light-emission efficiency of the lighting modules 100 used is basically classified into three levels.

The reason for this classification is as follows: Because of a manufacturing variation in the LED-element chips, a distribution exists in the light-emission efficiency. Accordingly, the LED-element chips themselves are ranked on each efficiency basis, and a lighting module with an excellent efficiency is fabricated by using a LED-element chip at an excellent-efficiency rank.

The efficiency distribution for LED-element chip production quantity is that the production quantity becomes the maximum at an intermediate efficiency value, and becomes smaller even if the efficiency becomes high or low. Intermediate-order (i.e., ordinary) efficiency LED-element chips can be produced in large quantities, whereas high-efficiency LED-element chips can be produced only in small quantities.

Although, as the backlight used for a LCD, the high-efficiency LED-element chips are desirable, the use of only the high-efficiency LED-element chips results in a higher cost for the LED-element chips. On account of this, the mixed use of the lighting modules using the high-efficiency LED-element chips and the lighting modules using the intermediate-order-efficiency LED-element chips gives rise to implementation of the cost lowering.

Figure 6:
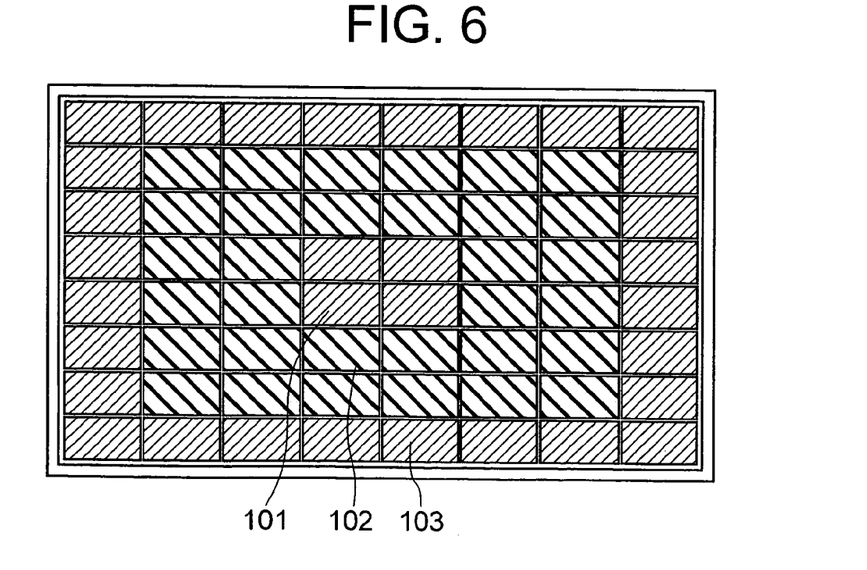
FIG. 6 is a lay-out diagram of the lighting modules with different efficiency levels in the first embodiment of the present invention.

As illustrated in FIG. 6, in the present embodiment, lighting modules 101 at an efficiency level 1 (i.e., best) are positioned in the central portion within the lighting unit 120. Also, lighting modules 103 at an efficiency level 3 (i.e., ordinary) are positioned in the peripheral portion within the lighting unit 120. Also, lighting modules 102 at an efficiency level 2 (i.e., good) are positioned therebetween.

Taking the following two conditions into consideration, this positioning has been devised and implemented: Namely, as the lighting unit 120, in the central-portion vicinity where temperature becomes comparatively higher, the light-emission efficiency of the LED elements is lowered by the temperature rise. Moreover, as picture-quality performance of the display, it is stipulated that brightness ratio between the central portion and the peripheral portion is permissible up to a degree that the brightness in the peripheral portion becomes equal to about 80%. Here, the brightness in the central portion is defined as being 100%.

In this way, the lighting modules whose efficiency levels differ from each other are positioned at appropriate places each. This positioning makes it possible to implement the cost lowering with the requested quality maintained.

Additionally, it is possible to derive the average light-emission efficiency of the lighting modules by measuring the electric power fed into each lighting module and the front-surface brightness thereof.

In some cases, no specific boundary lines exist for the ranks (i.e., average values) of the efficiency levels of the respective lighting modules. As the present embodiment, however, the positioning is performed in such a manner that the average light-emission efficiency of the lighting modules close to the central portion of the lighting unit 120 becomes comparatively higher.

As having been explained so far, in the present embodiment, the outside configuration of each lighting module is the rectangle. Also, the aspect ratio is equal to 16:9, and the diagonal size is equal to about 100 mm. Moreover, the electrical connectors face each side, and, on the two sides opposed to each other, the electrical connectors are positioned at the positions opposed to the adjacent lighting modules. These characteristics allow the lighting modules to be made adaptable to the variations in the backlight sizes in the scaleable manner. This results in a high mass productivity, thereby making it possible to implement the cost lowering.

Also, the electrical connectors are not positioned between the LED elements, i.e., the light-source components, and each side of each lighting module. As a result, it becomes possible to position the light-source components with the substantially equal spacing within each lighting module and between the respective lighting modules as well. This allows implementation of the excellent light uniformity.

Furthermore, the flat surfaces parallel to the lighting-module flat surface are provided on the light-source components, and the exceedingly-high reflectivity diffuser is pasted on the flat surfaces. This allows the enhancement in the light-emission efficiency. In addition, of the lighting modules fabricated in the manner of being classified according to the ranks of the light-emission efficiency of the LED elements, the high-efficiency lighting modules are positioned in the central portion. This positioning makes it possible to implement the cost lowering with the requested performance satisfied.

This makes it possible to provide the low-cost, no picture-quality degradation, and high picture-quality lighting unit and lighting modules for liquid-crystal displays, and the liquid-crystal displays using these unit and modules.

Incidentally, in the present embodiment, the electrical connectors among the respective lighting modules are provided in both the longitudinal direction and the transverse direction. Depending on the electrical connection configuration, however, the electrical connectors may be provided in only either the longitudinal direction or the transverse direction.

Embodiment 2

The second embodiment is the same as the first embodiment except for the following features:

The lighting module 100 in the first embodiment implements no elements other than the light-source components 115 on the lighting module. In addition, the components 115 are implemented on the one-side surface alone. However, the lighting module 100 in the present embodiment implements the LED elements 115, i.e., the light-source components, on the front-surface side, and implements the light-source control components and the electrical connectors on the back-surface side.

Figure 7:
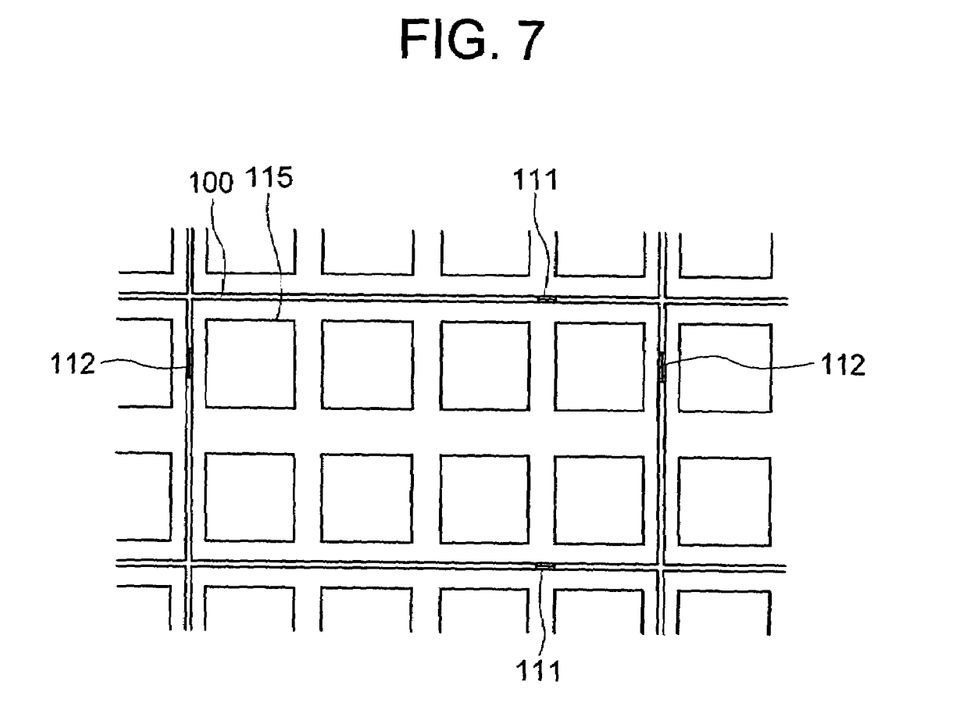
FIG. 7 is an outside configuration diagram where each lighting module used in a lighting unit in a second embodiment of the present invention is seen from side of each light-source component surface.

FIG. 7 illustrates a diagram where the lighting module 100 used in a lighting unit in the second embodiment is seen from the front-surface side.

Although the LED elements 115, i.e., the light-source components, are implemented on the front surface, the longitudinal-direction electrical connectors 111 and the transverse-direction electrical connectors 112 are implemented on the back surface. As a result, the electrical connectors can only be seen slightly from through clearances between the respective lighting modules. In this case, unlike FIG. 3 in the first embodiment, no limitation is imposed on positioning positions of the electrical connectors 111 and 112.

Figure 8:
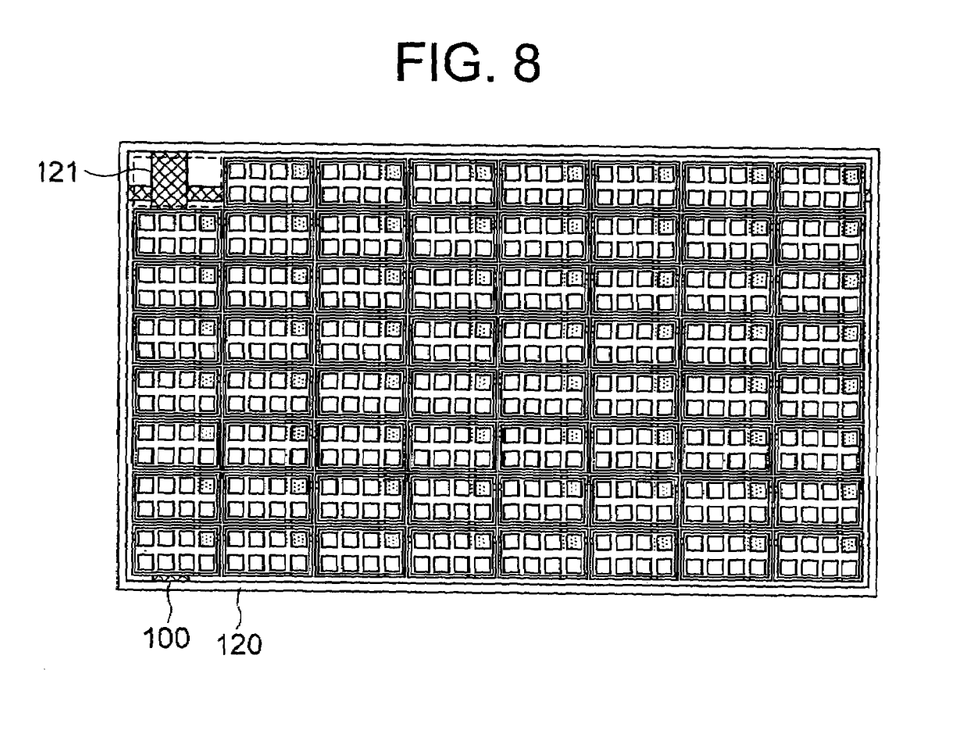
FIG. 8 is a diagram for illustrating the lighting unit where the lighting modules in the second embodiment of the present invention arranged in a flat-surface-like manner.

As illustrated in FIG. 8, these lighting modules 100 are set in such a manner that the lighting modules 100, which are 8×8 in number in the transverse and longitudinal directions, are arranged on a rear-surface lattice frame 121 of the lighting unit 120. This makes it possible to configure the lighting unit 120 in 32-inch diagonal size.

Figure 9:
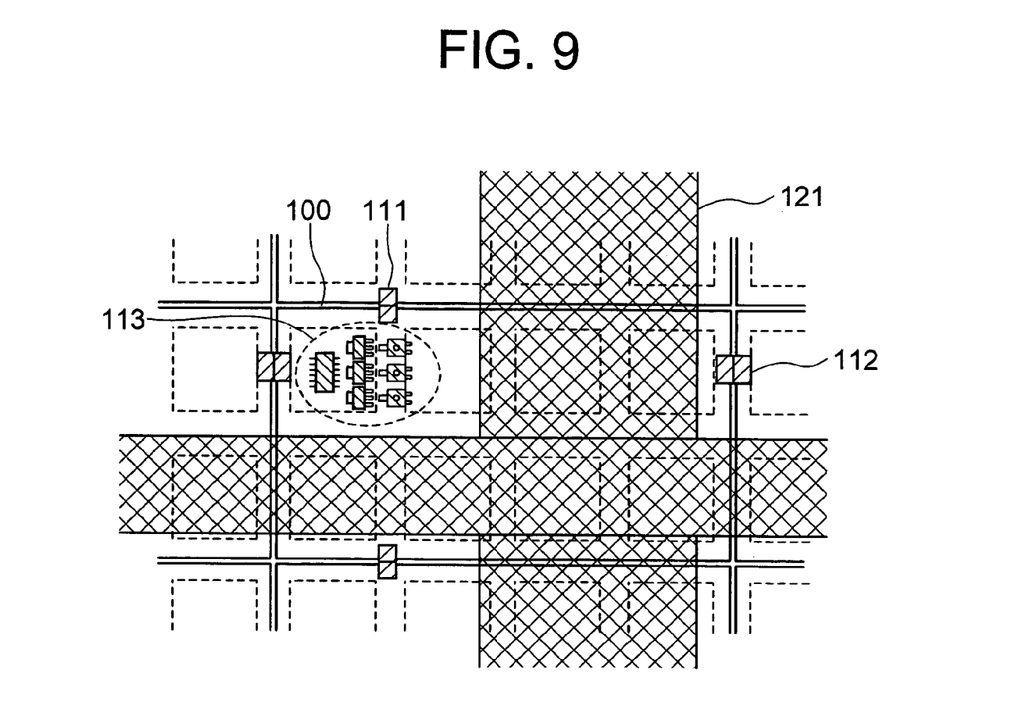
FIG. 9 is an outside configuration diagram where each lighting module used in the lighting unit in the second embodiment of the present invention is seen from sides of electrical connectors and control component surface.

Next, FIG. 9 illustrates a diagram where the lighting module 100 in the state of being set within the lighting unit 120 is seen from the back-surface side. The longitudinal-direction electrical connectors 111, the transverse-direction electrical connectors 112, and the light-source control components 113 are positioned at portions which are in no contact with the rear-surface lattice frame 121 on the back surface of the lighting module 100.

Figure 10:
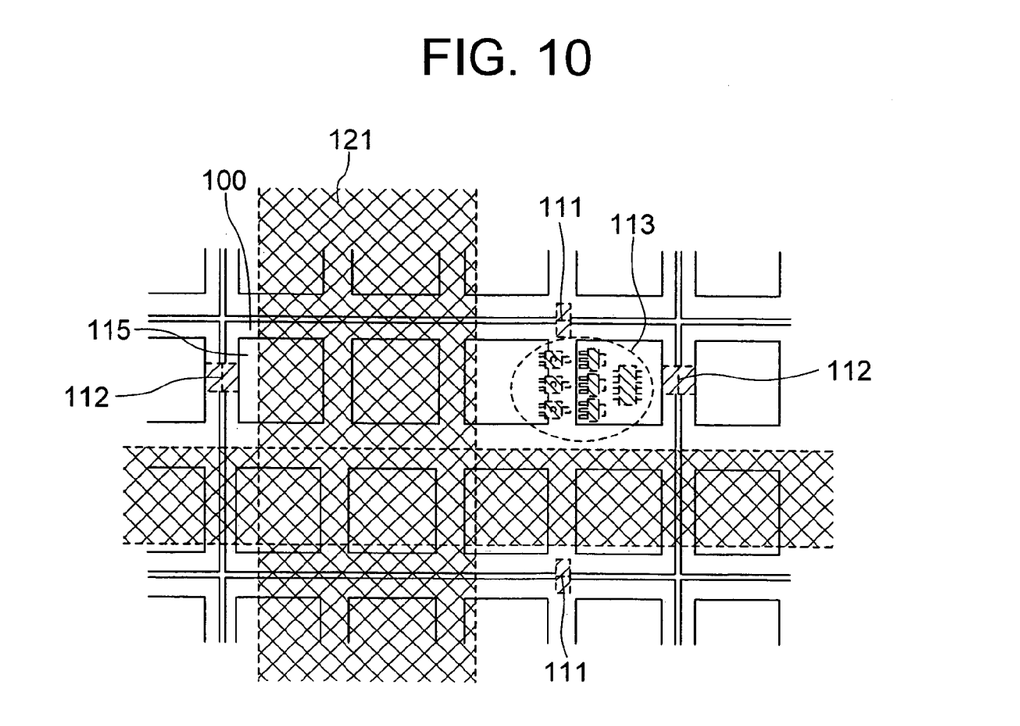
FIG. 10 is a perspective view of each lighting module used in the lighting unit in the second embodiment of the present invention from side of each light-source component surface to a back surface.

Incidentally, FIG. 10 illustrates a perspective view of the lighting module 100 from the front surface to the back surface.

In FIG. 9 and FIG. 10, a row selection signal is supplied to the right and left transverse-direction electrical connectors 112, thereby selecting the lighting modules 100 in the row unit. Then, a control signal is supplied from the up and down longitudinal-direction electrical connectors 111 to the light-source control components 113 in the respective columns of the lighting modules 100 selected in the row unit. Based on this control signal, the light-source control components 113 control the respective LED elements 115.

In the case of the present embodiment, the light-source control components 113 are provided in the lighting-module-100 unit. On account of this, the light-source control components 113 can simultaneously control all of the LED elements 115 in the lighting-module-100 unit. In addition thereto, the components 113 can control the respective LED elements 115 individually, or can control the elements 115 collectively (e.g., in a manner of being collected in the row unit or column unit). This allows execution of a detailed and finer lighting control in response to a display signal.

The electrical connectors and the light-source control components are positioned in this way. On account of this positioning, it becomes possible to position the LED elements 115, i.e., the light-source components on the front-surface side of the lighting module 100, with a substantially equal spacing within each lighting module and between the respective lighting modules as well. This allows implementation of the excellent light uniformity as the lighting unit.

As having been explained so far, in the present embodiment, in comparison with the first embodiment, in the case as well where the light-source control components are added to the lighting module 100, the electrical connectors and the light-source control components are positioned at the places which are in no contact with the rear-surface lattice frame on the back surface. This positioning makes it possible to position the light-source components on the lighting-module front surface with the substantially equal spacing within each lighting module and between the respective lighting modules. This allows implementation of the excellent light uniformity.

This makes it possible to provide a low-cost, no picture-quality degradation, and high picture-quality lighting unit and lighting modules for liquid-crystal displays, and the liquid-crystal displays using these unit and modules.

Embodiment 3

The third embodiment is the same as the first embodiment except for the following features:

In the third embodiment, unlike the first embodiment, the lighting modules whose efficiency levels differ from each other are not used on each place basis in the classified manner. Instead, the low-cost lighting modules at the efficiency level 3 (i.e., ordinary) are used at all the places.

In the case like this, in the central-portion vicinity of the lighting unit 120, the temperature is more likely to become comparatively higher as compared with the other places. Consequently, the efficiency of the lighting modules in the central-portion vicinity is lowered by the temperature rise as compared with the lighting modules in the peripheral portion. This situation, in some cases, lowers the brightness on average.

Figure 11:
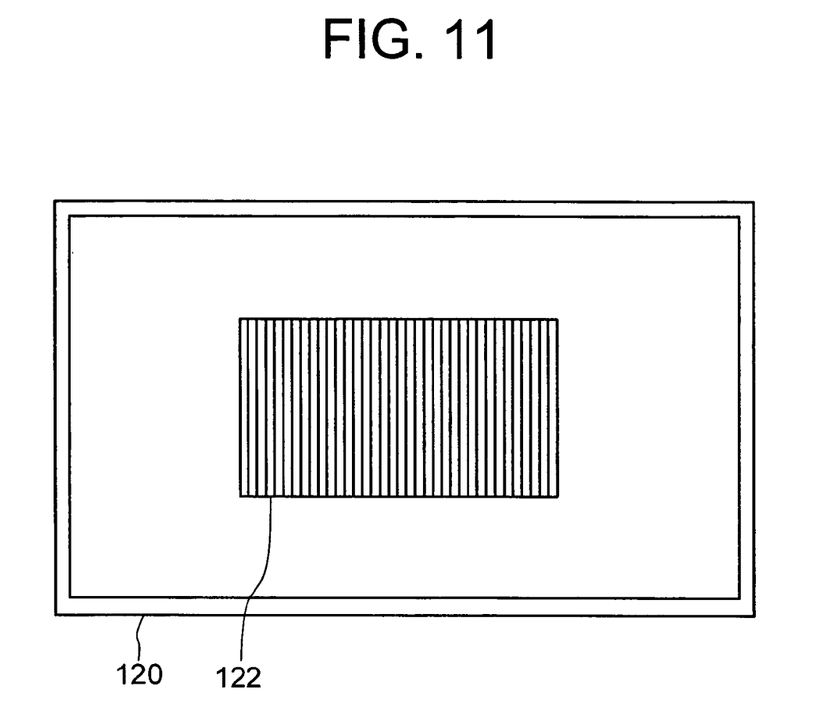
FIG. 11 is a diagram for illustrating side of a back surface of a lighting unit in a third embodiment of the present invention.

As illustrated in FIG. 11, in the present embodiment, in order to improve the brightness lowering in the central-portion vicinity, a heat sink 122 is provided in the central portion of the rear-surface board of the lighting unit 120 on the opposite side to the lighting-module-100 set side. This suppresses the rise in the heat in the central-portion vicinity, thereby preventing the brightness lowering due to the efficiency lowering.

As having been explained so far, in the third embodiment, in comparison with the first embodiment, the lighting modules at the high-efficiency level are not used. This condition brings about the cost lowering. In addition, the heat sink is provided in the back-surface central portion of the rear-surface board, thereby suppressing the brightness lowering in the central portion. This condition makes it possible to provide a low-cost, no picture-quality degradation, and high picture-quality lighting unit for liquid-crystal displays.

Embodiment 4

The fourth embodiment is the same as the first embodiment except for the following features:

As is the case with the first embodiment, the outside configuration of a lighting module 100 in the present embodiment is a rectangle. However, the aspect ratio is equal to 4:3, i.e., not 16:9. Also, as is the case with the first embodiment, the diagonal size is also equal to about 100 mm. Accordingly, by setting the distances between adjacent lighting modules to be about 1 mm, the lighting-module spacing in the diagonal direction becomes equal to about 4 inches.

As having been explained in the first embodiment, at present, in many of the large-sized liquid-crystal TVs, in order to implement optimization for High-Definition TV Broadcasting, the aspect ratios of the screens are made equal to about 16:9.

However, terrestrical analogue broadcasting whose screen ratio is equal to the currently-used 4:3 will be broadcasted until 2011. Accordingly, the TV sets with the 4:3 screen ratio still exist in considerably large number. Also, an overwhelming majority of the liquid-crystal monitors for personal computers is equipped with the 4:3 screen ratio. For these reasons, the LCDs with the 4:3 screen ratio also exist in tremendously large number.

In the fourth embodiment, the outside configuration of the lighting module 100 is also made equal to 4:3. This condition, as is the case with the first embodiment, allows the lighting modules to be made adaptable to the backlight sizes in the scaleable manner. This allows implementation of the mass-production effect, thereby making it possible to implement the cost lowering.

As having been explained so far, in the present embodiment, the outside-configuration aspect ratio of the lighting module is made equal to 4:3. On account of this, in the case as well where the present lighting unit is used as the lighting unit for the LCDs whose screen ratio is equal to 4:3, the resultant mass-production effect allows implementation of the cost lowering. As a consequence, it becomes possible to provide a low-cost, no picture-quality degradation, and high picture-quality lighting unit for liquid-crystal displays.

Embodiment 5

Figure 12:
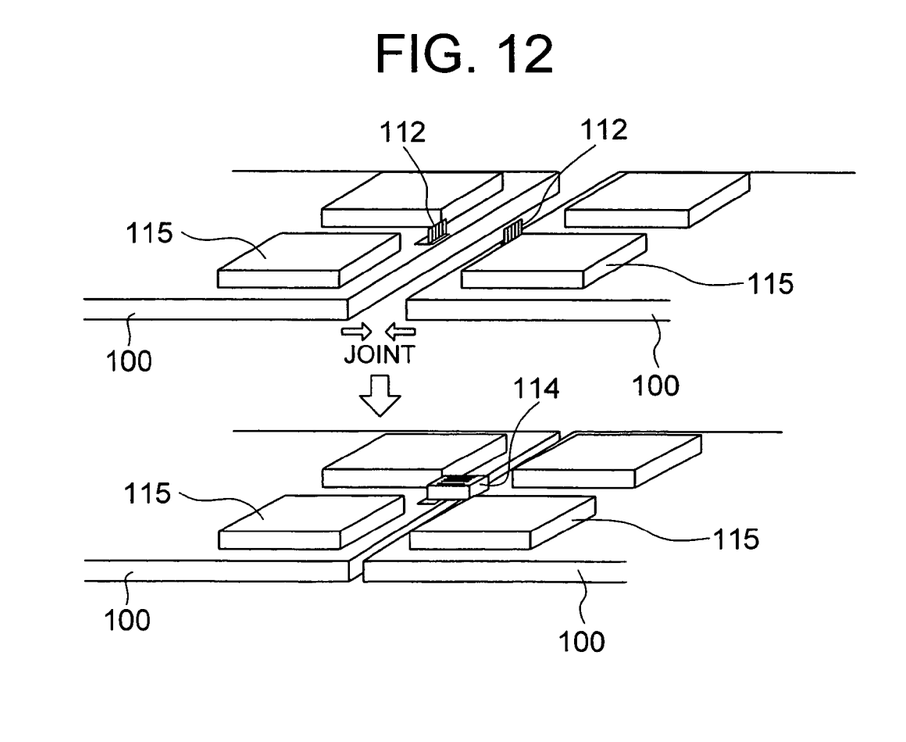
FIG. 12 is a diagram for illustrating electrical connectors of each lighting module in a fifth embodiment of the present invention.

The fifth embodiment is the same as the first embodiment except for the following features:

As illustrated in FIG. 12, in the fifth embodiment, the electrical connectors within the lighting module 100 are not connectors but pin terminals. After having arranged the lighting modules 100 on the rear-surface board of the lighting unit 120, the pin terminals between the respective lighting modules are connected to each other by a connecting jumper component 114.

In the fifth embodiment, the electrical connectors are simplified from the connectors to the pin terminals. This makes it possible to implement somewhat more cost lowering.

The electrical connection among the respective lighting modules requires the connecting jumper component 114, and also requires a time and labor for the implementation. Considering the circumstances in total, however, it becomes possible to implement the somewhat more cost lowering than the first embodiment.

As having been explained so far, in the present embodiment, the electrical connectors of the lighting modules are simplified to the pin terminals. This makes it possible to implement the cost lowering further. As a consequence, it becomes possible to provide a low-cost, no picture-quality degradation, and high picture-quality lighting unit and lighting modules for liquid-crystal displays.

Embodiment 6

Figure 13:
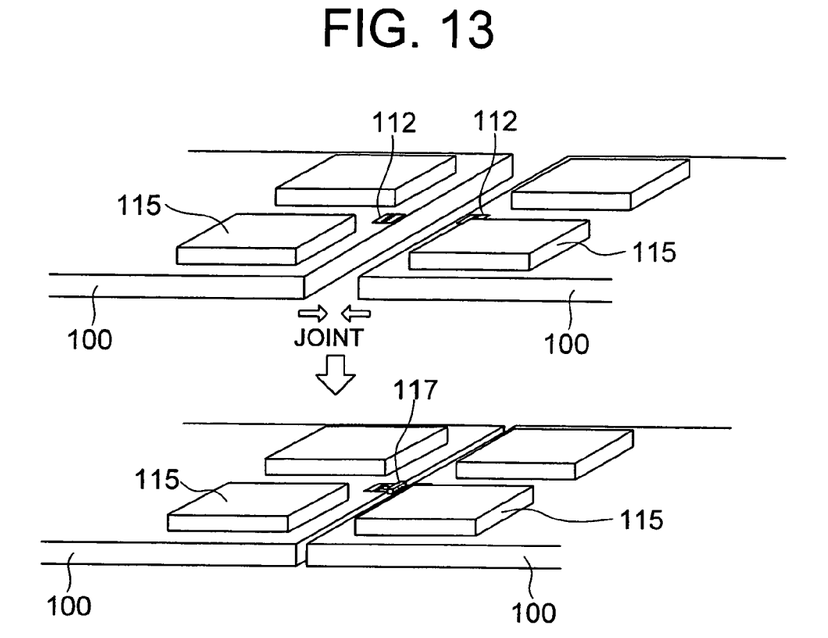
FIG. 13 is a diagram for illustrating electrical connectors of each lighting module in a sixth embodiment of the present invention.

The sixth embodiment is the same as the first embodiment except for the following features:

As illustrated in FIG. 13, in the sixth embodiment, the electrical connectors within the lighting module 100 are not plug-in-type connectors but printed wiring patterns being capable of soldering. After having arranged the lighting modules 100 on the rear-surface board of the lighting unit 120, the printed wiring patterns between the respective lighting modules are connected to each other by being soldered using a connecting pin component 117.

In the sixth embodiment, the electrical connections are simplified from the plug-in-type connectors to the printed wiring patterns. This makes it possible to implement somewhat more cost lowering.

The electrical connection among the respective lighting modules requires the connecting pin component, and also requires a cost for the implementation of soldering. Considering the circumstances in total, however, it becomes possible to implement the somewhat more cost lowering than the first embodiment.

As having been explained so far, in the present embodiment, the electrical connectors of the lighting modules are simplified to the printed wiring patterns. This makes it possible to implement the cost lowering further. As a consequence, it becomes possible to provide a low-cost, no picture-quality degradation, and high picture-quality lighting unit and lighting modules for liquid-crystal displays.

Embodiment 7

Figure 14:
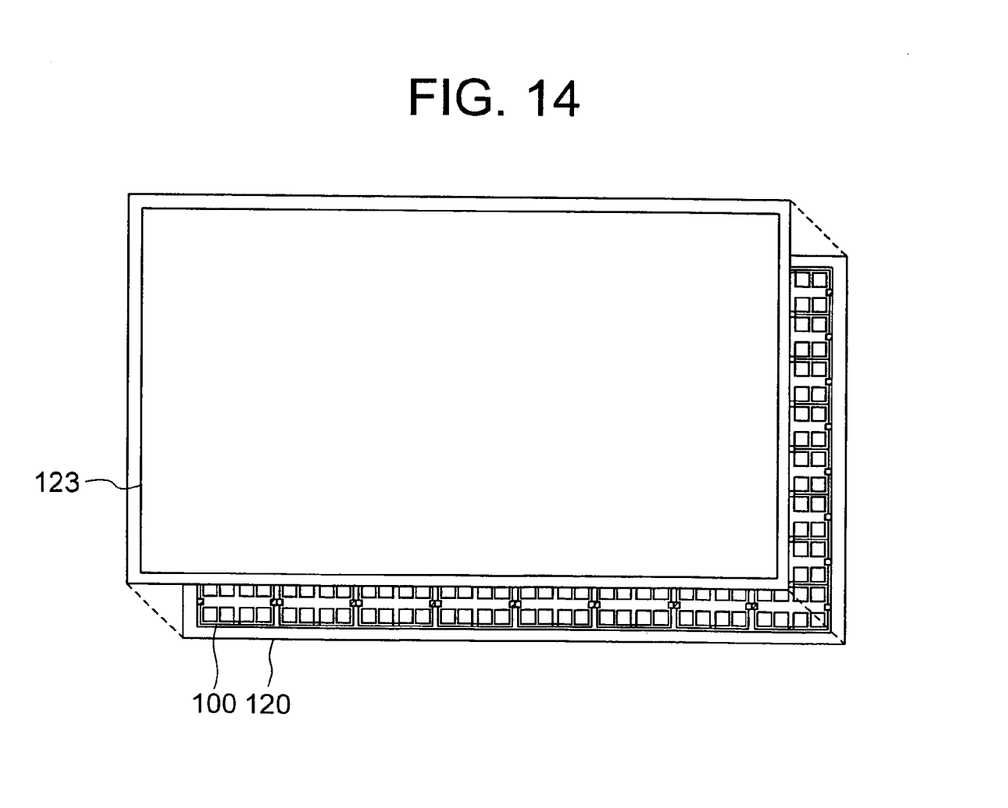
FIG. 14 is a diagram for illustrating a liquid-crystal display in a seventh embodiment of the present invention.

FIG. 14 illustrates a liquid-crystal display in the seventh embodiment.

In the seventh embodiment, as the backlight for a liquid-crystal panel 123, the low-cost and high light-uniformity lighting unit 120 in the first embodiment is used. As a consequence, it becomes possible to provide the low-cost, no picture-quality degradation, and high picture-quality liquid-crystal display.

Embodiment 8

FIG. 15 illustrates a cross-sectional view of a liquid-crystal display in the case where lighting modules 100 in the seventh embodiment are assembled to be used as the backlight.

A diffuser 124 is set such that the plate 124 is an order of 2 cm away form the lighting modules 100 arranged in a flat-surface manner on the rear-surface lattice frame 121. Moreover, an optical film 125 is positioned on the plate 124. In addition, the liquid-crystal panel 123 is set on the film 125 further.

Light emitted from each LED element 115 within the lighting module 100, first of all, collides with the diffuser plate 124 existing on the surface situated above. Then, the light is scattered inside the diffuser 124. Furthermore, although a part of the light travels toward the liquid-crystal panel 123 just as it is, the other light returns in the lighting-modules-100 direction.

The light which has returned is scattered and reflected by the diffuser 107 pasted on the respective LED elements 115 in the lighting-modules-100 unit, then traveling again in the direction of the diffuser plate 124. Furthermore, although a part of the light travels toward the liquid-crystal panel 123, there also exists the light which returns again.

Through this repetition, the lights emitted from the respective LED elements 115 are even further uniformalized by the positioning characteristic of the equal-spacing LED elements 115. This situation even further reduces the light-emission unevenness in the boundaries of the respective lighting modules 100, simultaneously reducing the unevenness that only the locations which are directly above the LED-element light-emission portions are bright.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A lighting unit whose area is implemented into a large area by assembling a plurality of lighting modules in a flat-surface-like manner, wherein:
   a plurality of electrical connectors are positioned in each lighting module, each of said electrical connectors has a rectangular shape, one of said electrical connectors is positioned at each side of the lighting module, and said plurality of electrical connectors connect the lighting module with adjacent lighting modules; and
   light-source components in each lighting module are LED elements, power-to-brightness conversion efficiency of a LED element used in a lighting module positioned in a central portion of said large area of said lighting unit is higher than power-to-brightness conversion efficiency of a LED element used in a lighting module positioned in a peripheral portion of said large area of said lighting unit.

2. The lighting unit according to claim 1, wherein said electrical connectors of each lighting module are basically positioned such that said electrical connectors face portions other than places at which perpendicular lines are dropped onto each side of each lighting module from the most-outer circumference of each light-source component in each lighting module.

3. The lighting unit according to claim 1, wherein said electrical connectors of each lighting module face two sides opposed to each other, said electrical connectors being further positioned at the same position in a direction perpendicular to said two sides.

4. The lighting unit according to claim 1, wherein, when the same lighting modules are made adjacent to each other by being made successive in a flat-surface manner, said electrical connectors of each lighting module are positioned such that said electrical connectors are opposed to each other.

5. The lighting unit according to claim 1, wherein a plurality of electrical connectors and a light-source control component for controlling each lighting module are positioned in each lighting module, each of said electrical connectors has a rectangular shape, one of said electrical connectors is positioned at each side of the lighting module, said plurality of electrical connectors connect the lighting module with adjacent lighting modules, and said electrical connectors and said light-source control component are positioned at portions which are in no contact with a support member for supporting each lighting module.

6. The lighting unit according to claim 5, wherein said electrical connectors of each lighting module are positioned such that said electrical connectors face each side of each lighting module.

7. The lighting unit according to claim 5, wherein said electrical connectors of each lighting module face two sides opposed to each other, said electrical connectors being further positioned at the same position in a direction perpendicular to said two sides.

8. The lighting unit according to claim 5, wherein, when the same lighting modules are made adjacent to each other by being made successive in a flat-surface manner, said electrical connectors of each lighting module are positioned such that said electrical connectors are opposed to each other.

9. The lighting unit according to claim 1, wherein light-source components in each lighting module are LED elements, a heat sink for exhausting heat with a high efficiency is installed on a rear-surface side of a central portion of said large area of said lighting unit.

10. The lighting unit according to claim 1, wherein upper portion of a light-source component in each lighting module is a flat surface which is parallel to a flat surface of each lighting module.

11. The lighting unit according to claim 1, wherein aspect ratio of each-lighting-module outside configuration is equal to about 16:9.

12. The lighting unit according to claim 1, wherein aspect ratio of each-lighting-module outside configuration is equal to about 4:3.

13. The lighting unit according to claim 1, wherein diagonal size of each-lighting-module outside configuration is equal to an integral multiple of about 1 inch.

14. A liquid-crystal display wherein said lighting unit according to claim 1 is used as a backlight.

15. A lighting module for a lighting unit, comprising:
a rectangular base;
a plurality of light emitting elements disposed on a surface of said rectangular base; and
a plurality of electrical connectors, the electrical connector being disposed one on each side of said base, for connecting said lighting module to other adjacent lighting modules to form the lighting unit;
wherein light-source components in each lighting module are LED elements, said respective lighting modules being fabricated in a manner of being classified according to rank of power-to-brightness conversion efficiency of said LED elements, and, when said plurality of lighting modules are assembled thereby to be used as said lighting unit, said lighting modules are positioned whose ranks differ depending on respective locations of peripheral portion and central portion of said lighting unit.

16. The lighting module according to claim 15, wherein said electrical connectors are basically positioned such that said electrical connectors face portions other than places at which normal lines are pulled down onto each side of each lighting module from the most-outer circumference of each light-source component.

17. The lighting module according to claim 15, wherein said electrical connectors of each lighting module and a light-source control component for controlling each lighting module are positioned at portions which are in no contact with a support member for supporting each lighting module.

18. The lighting module according to claim 15, wherein said electrical connectors of each lighting module face two sides opposed to each other, said electrical connectors being further positioned at the same position in a direction perpendicular to said two sides.

19. The lighting module according to claim 15, wherein, when the same lighting modules are made adjacent to each other by being made successive in a flat-surface manner, said electrical connectors of each lighting module are positioned such that said electrical connectors are opposed to each other.

20. The lighting module according to claim 15, wherein upper portion of a light-source component in each lighting module is a flat surface which is parallel to a flat surface of each lighting module.

21. The lighting module according to claim 15, wherein aspect ratio of each-lighting-module outside configuration is equal to about 16:9.

22. The lighting module according to claim 15, wherein aspect ratio of each-lighting-module outside configuration is equal to about 4:3.

23. The lighting module according to claim 15, wherein diagonal size of each-lighting-module outside configuration is equal to an integral multiple of about 1 inch.

24. A liquid-crystal display wherein said plurality of lighting modules according to claim 15 are assembled thereby to be used as a backlight.

* * * * *